3,381,695
CONVEYING APPARATUS
Chester G. Clark, Grosse Pointe Woods, Mich., assignor to The Udylite Corporation, a corporation of Delaware
Filed Aug. 3, 1966, Ser. No. 570,020
8 Claims. (Cl. 134—77)

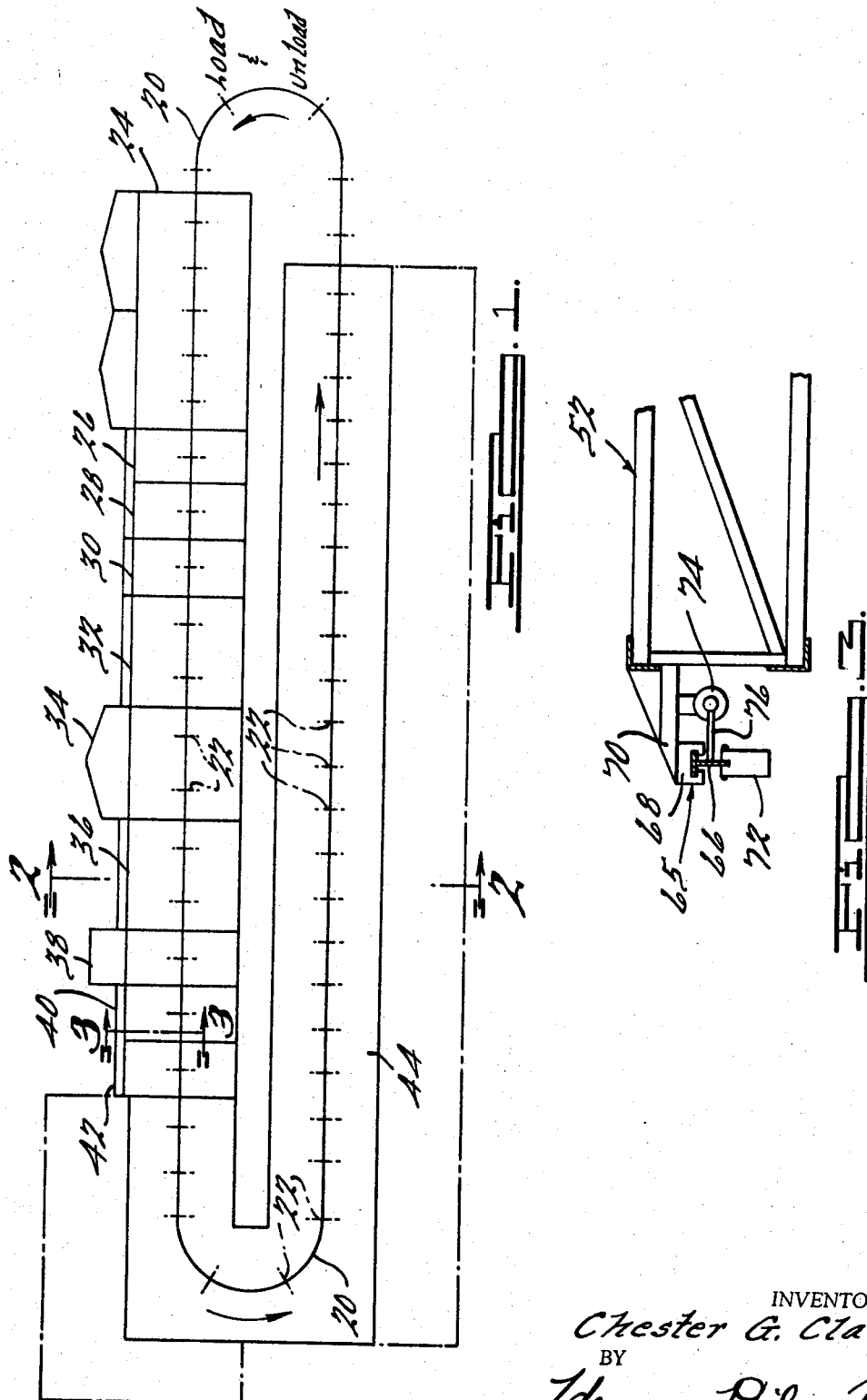

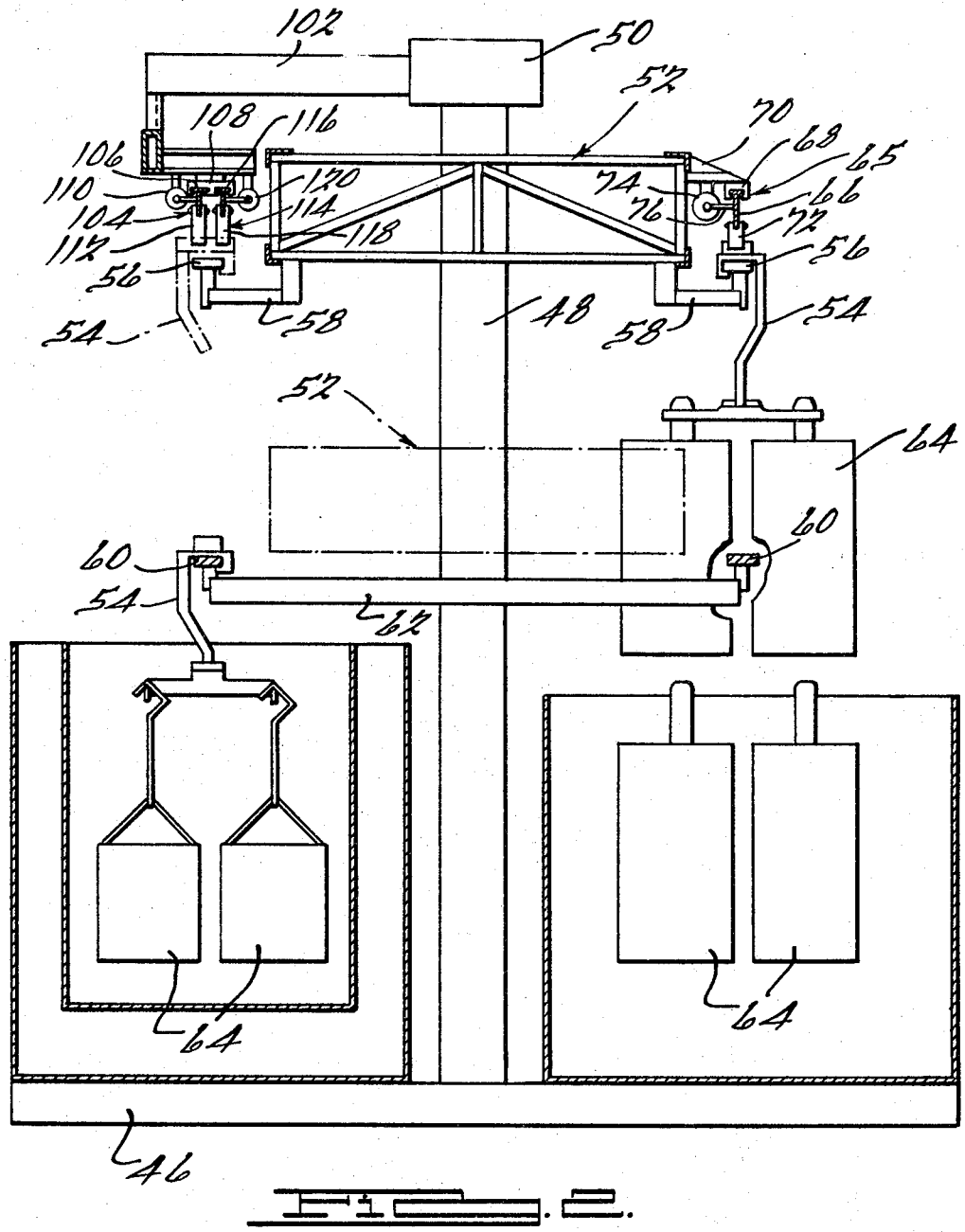

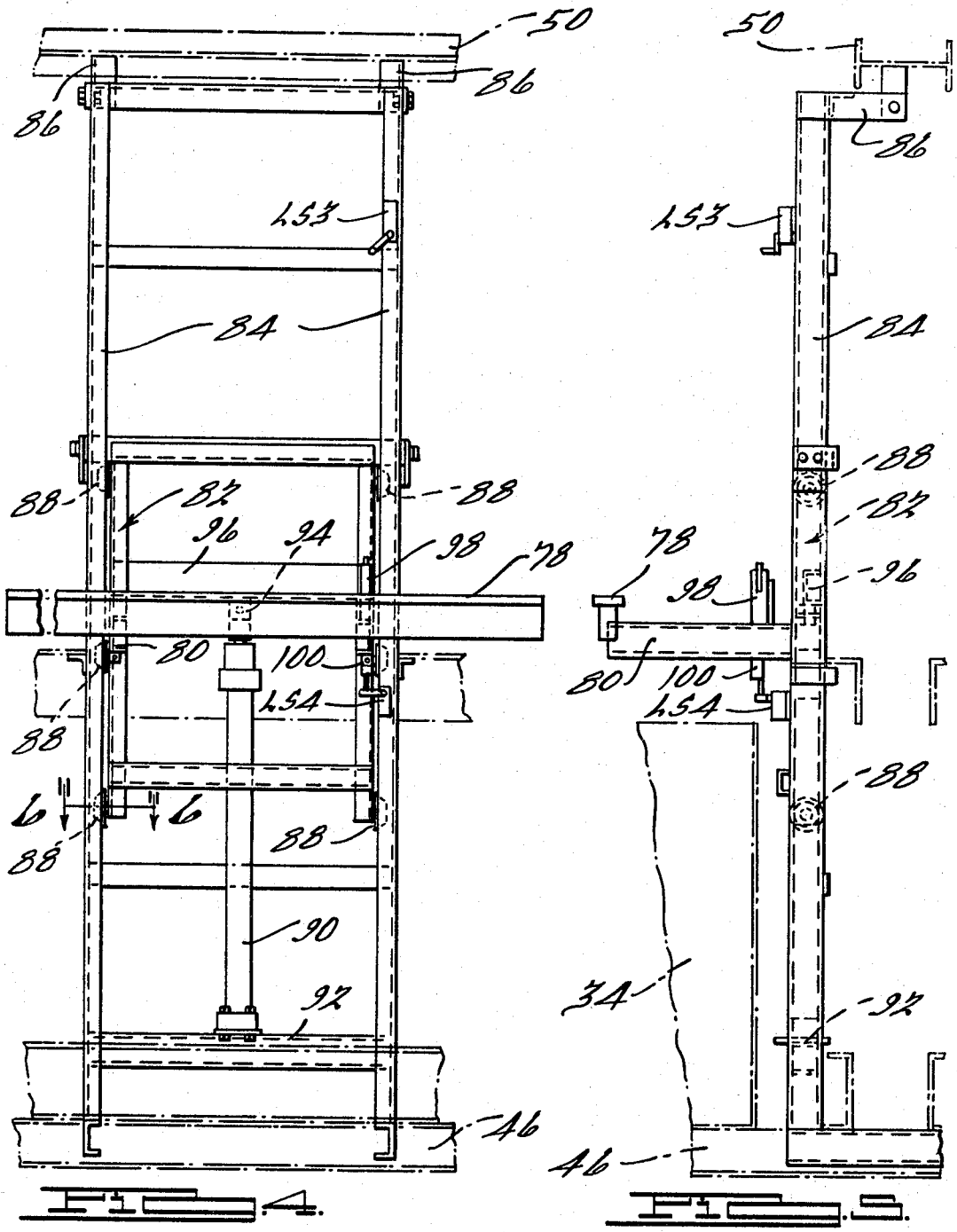

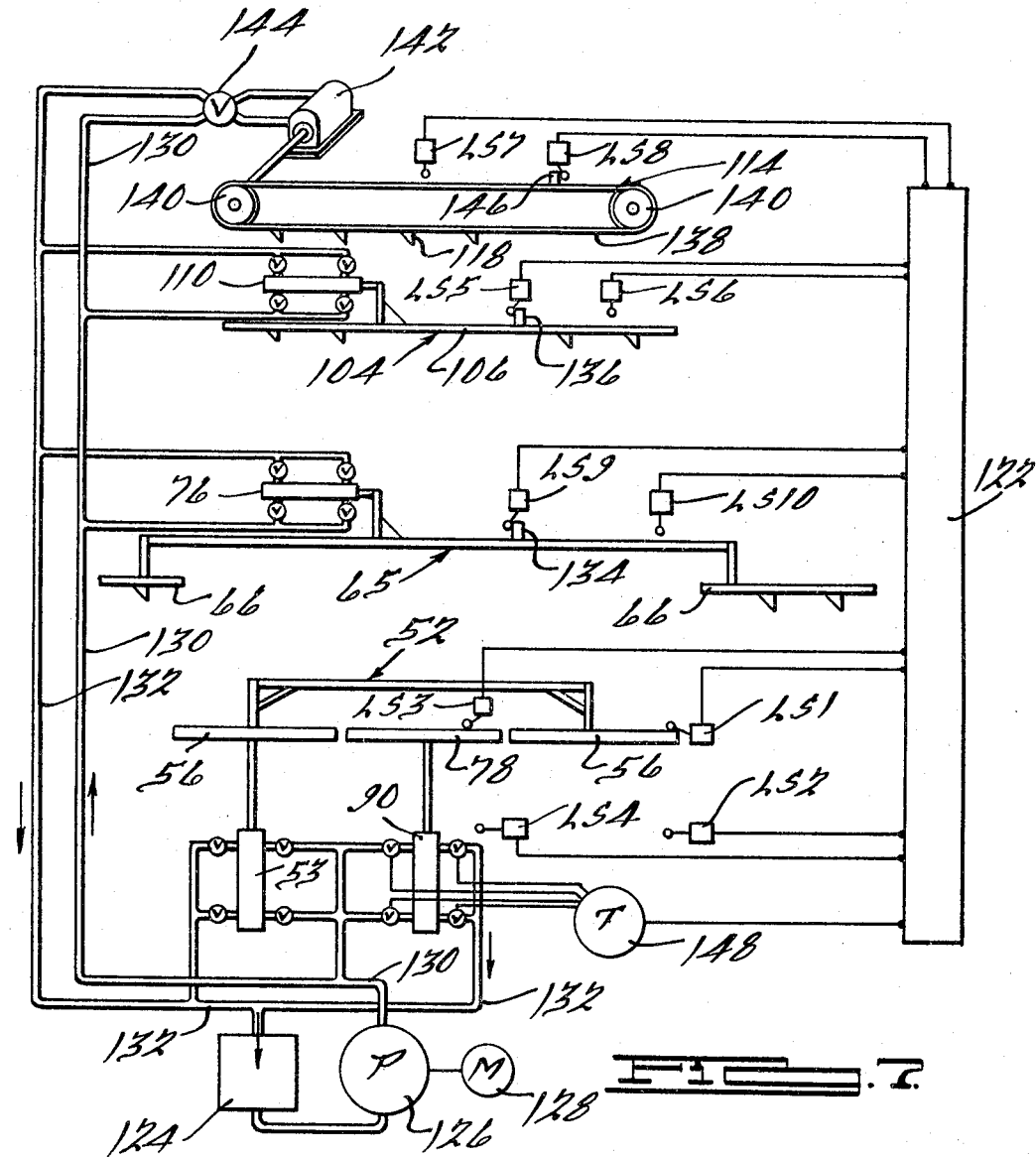

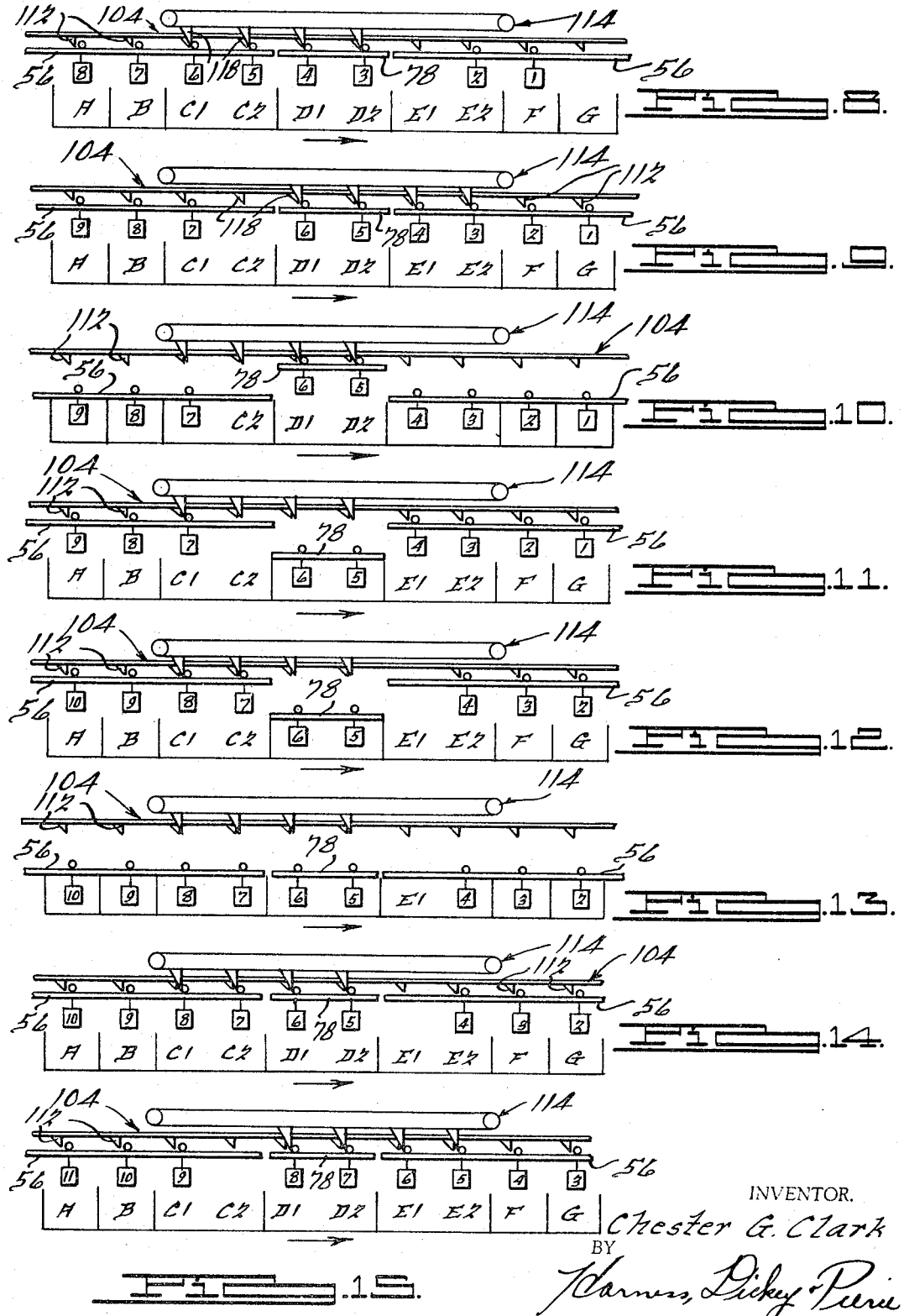

The present invention broadly relates to conveying apparatus, and more particularly, to an improved conveying machine of the type employed for sequentially transferring workpieces through a prescribed treating sequence. More specifically, the present invention is directed to an improved conveying machine and sequence for processing workpieces, whereby increased versatility can be achieved in providing variations in the duration of treatment of the workpieces at one or more treating sections along the processing cycle.

The present invention is particularly applicable to conveying machines of the general type disclosed in United States Patent No. 2,591,681, granted Apr. 8, 1952, and in United States Patent No. Re. 24,072, of Oct. 11, 1955, which was originally United States Patent No. 2,650,600, granted Sept. 1, 1953, all of which are assigned to the same assignee as the present invention. Conveying machines of the type disclosed in the aforementioned patents are employed for transferring a plurality of workpieces suspended from a rail around a circuit usually having two straight side sections connected at one or both of their ends by an arcuate turn-around section. A reciprocating-type transfer mechanism is employed for intermittently moving the workpieces in spaced relationship along the circuitous rail through a series of work stations, such as, electroplating and cleaning tanks, for example, and the workpieces are periodically lifted in order that they may be transferred above the partitions separating adjoining treating tanks. The workpiece lifting device is conventionally comprised of an elevator chassis having an outer periphery substantially coextensive with the circuitous path of travel of the workpieces and movable up and down between a raised position and a lowered position. Sections of the workpiece supporting rail are secured to the chassis such that workpieces suspended therefrom are lifted and lowered as the elevator chassis is raised and lowered. Other sections of the rail are fixed in a lowered position, to which and from which the workpieces are sequentially transferred when the elevator chassis is in the lowered position.

Portions of the elevator chassis, as disclosed in United States Patent No. 3,024,794, granted Mar. 13, 1962, which is also assigned to the same assignee of the present invention, may be adapted to move independently of the elevator chassis. This provision permits the immersion period of the workpieces in any selected tank or tanks to be reduced by either maintaining the independently movable portion of the chassis in an elevated position until some time after the principal elevator chassis has been lowered, or alternatively, by raising the independently movable chassis section prior to the time that the principal elevator chassis is raised. The independently movable chassis section can also be retained in the raised position whereby the workpieces suspended from the supporting rail thereof undergo a skip operation and are not subjected to the treatment at the work station disposed therebelow.

The provision of such an independently movable elevator chassis section provides for an increase in the flexibility and versatility to which the workpieces can be subjected as may be required from time to time to alter their treating sequence consistent with their intended end use. Selective manipulation of such an independently movable chassis section also enables concurrent processing of workpieces which require small deviations in their total treatment, and whereby the independently movable chassis section enables the prescribed variations to occur at selected treating stations.

There has been a continuing problem, however, in providing complete versatility and selectivity of the duration of treatment of workpieces at such sections of the treating process which are serviced by an independently movable chassis section. Moreover, there has been a long-felt, heretofore unfilled need for means for providing an increase in the duration of time to which the workpieces can be subjected at such treating stations beyond the normal treating time as enabled by the preset operating cycle of the machine. Practical considerations control the duration of the preset machine operating cycle consistent with the minimum time interval required for treatment of the workpieces at each of a series of treating stations, as well as the physical size of the resultant conveying machine, as established by the number of such stations and the size thereof. Conventionally, the cleaning and finishing treatments to which workpieces are subjected in an electroplating operation, for example, comprise a series of relatively short duration treatments, whereas the intervening electrochemical and electroplating treating operations comprise comparatively long duration processing steps. Accordingly, the operating cycle of the machine is conventionally based on the time requirement of the relatively short cleaning and finishing steps, while the intermediate longer duration treatments are accomplished in multiple-station treating tanks. By virtue of the foregoing, optimum utilization of equipment and plant space is achieved, but with a corresponding sacrifice in the versatility of adapting the machine to relatively long duration treatments at certain sections thereof, and preventing extreme flexibility in the selection between a skip operation and a long down dwell period, as is required when processing workpieces having different finishing requirements.

It is, accordingly, a principal object of the present invention to provide an improved conveying machine of the foregoing general type which overcomes the problems and disadvantages associated with similar type machines, while at the same time retaining the advantages of compactness and efficiency in processing workpieces.

Another object of the present invention is to provide an improved conveying machine incorporating one or more independently movable supporting rail sections, which are movable independently of the remaining rail sections, providing therewith increased versatility in the processing cycle to which workpieces can be subjected, and further enabling greater latitude and complete flexibility in the selection of the duration of treatment of the workpieces at those selected sections of the machine.

Still another object of the present invention is to provide an improved conveying machine in which workpieces, at selected stations thereof, can be subjected to a duration of treatment while in a lowered position which ranges from zero to a period greater than the normal down dwell operating cycle time inherent in the machine.

A further object of the present invention is to provide a conveying machine which provides for increased flexibility in the processing sequence to which workpieces can be subjected while simultaneously providing for a substantial simplification in the construction and coordination of the operating components required to provide such flexibility of operation.

Still a further object of the present invention is to provide an improved conveying machine which is of simple design, durable construction and operation, and of economical manufacture and use.

The foregoing and other objects and advantages of the present invention are achieved by a conveying machine incorporating three individual groups of treating stations, above which rail means are provided and wherein the intermediate rail section is movable independently of the adjoining rail sections. The work carriers movably supported on the several rail sections are advanced along the outer rail sections in one station increments by a first transfer mechanism, and on-and-off the intermediate rail section by a second transfer mechanism which is operative to advance the work carriers through multiple-station increments and in groups such as pairs, threes, fours, etc. The intermediate rail section can be retained in a raised position above the intermediate stations or, alternatively, can be lowered at a preselected time period after the lowering of the end rail sections so as to provide the requisite treating duration for the workpieces suspended on the intermediate rail section. The second transfer mechanism which is operable to transfer a plurality of workpieces through a multiple-station increment operates only once for each of a corresponding number of single-station transfer movements of the first transfer mechanism whereby the workpieces are grouped preliminarily to being transferred to the intermediate rail section and are thereafter ungrouped or separated upon being transferred to the next adjacent rail section.

Other objects and advantages of the present invention will become apparent from the following detailed description, taken in conjunction with the accompanying drawings, wherein:

FIGURE 1 is a diagrammatic plan view illustrating a typical layout of treating stations through which workpieces are adapted to be sequentially conveyed by the conveying apparatus comprising the present invention;

FIGURE 2 is a transverse vertical sectional view through the conveying machine shown in FIGURE 1, and taken substantially along the line 2—2 thereof;

FIGURE 3 is a fragmentary transverse vertical sectional view of a portion of the elevator chassis of the conveying machine shown in FIGURE 1, and taken along the line 3—3 thereof;

FIGURE 4 is a fragmentary front elevational view of the mechanism for providing independent up and down movement of the intermediate rail section;

FIGURE 5 is a side elevational view of the mechanism shown in FIGURE 4;

FIGURE 6 is a horizontal sectional view through the roller support of the mechanism shown in FIGURE 4, and taken along the line 6—6 thereof;

FIGURE 7 is a schematic diagram of the control circuit and hydraulic circuit as related to the several operating components of the conveying machine providing coordinated operation thereof; and FIGURES 8 through 15, inclusive, are schematic elevational views illustrating the operating sequence of a typical embodiment of the machine comprising the present invention.

Referring now in detail to the drawings, and as may be best seen in FIGURE 1, a typical use of the conveying machine comprising the present invention is illustrated for sequentially conveying workpieces to be processed through a prescribed treating sequence. The supporting rail, which is indicated at 20, extends in a circuitous path above the treating stations and comprises two straight side sections connected at their ends by arcuate turn-around sections. The supporting rail 20 is of a segmented construction, wherein the ends of the rails are adapted to be disposed in alignment either in a raised or lowered position thereof, in order to receive workpieces being advanced therealong. The typical disposition of the work racks on the supporting rail 20, when disposed at a treating station, are indicated by the short dotted lines referenced by the numeral 22, which correspond substantially to the center of each of the treating stations along the supporting rail. At the right-hand end of the machine, as illustrated in FIGURE 1, no treating receptacles are present and this portion of the machine is conventionally employed for loading and unloading the workpieces from the work carriers movably supported on the supporting rail. The individual workpieces are transferred along the supporting rail from station to station in a counterclockwise direction, as indicated by the arrows in FIGURE 1.

The layout of the treating stations and treating receptacles as illustrated in FIGURE 1, is typical of an arrangement employed for applying chromate coatings to the surfaces of workpieces. In accordance with this typical process, the workpieces, after being loaded on the work carriers at the load station at the right-hand end of the machine as viewed in FIGURE 1, are transferred into a five-station tank, indicated at 24, in which they are subjected to a soak-cleaning operation, after which they are transferred successively through two single-station treating receptacles 26 and 28, and are spray rinsed. The workpieces thereafter are transferred in succession from the spray rinse tank 28 to an acid dip tank, indicated at 30, and thence to a rinse and spray two-station tank, indicated at 32. Upon leaving the spray rinse tank 32, they are transferred into a chemical deburring two-station tank, indicated at 34, which, in accordance with the practice of the present invention, is provided with an independently movable rail section as subsequently to be described for varying the chemical deburring treatment of the workpieces consistent with the nature of the workpieces being processed.

Upon emergence from the treating receptacle 34, the workpieces are transferred to a two-station tank 36, at which they are again subjected to a rinse and spray operation, and are subsequently successively transferred through treating tank 38 at which a chromate coating is applied thereto. Single-station tanks 40 and 42 are employed for a further rinse and spray operation of the chromated workpieces, after which they are transferred to a multiple-station receptacle 44 in which the workpieces are dried and are subsequently unloaded at the unload station at the right-hand end of the machine.

The structural features of the machine to achieve the processing sequence, as hereinbefore described in connection with FIGURE 1, will now be described with particular reference to FIGURES 1–6 inclusive. As may be best seen in FIGURES 1 and 2, the conveying machine comprises a base or platform 46 on which a series of upright columns 48 are rigidly secured and are interconnected at the upper end portions thereof by a longitudinally extending beam 50. An elevator chassis 52 is movably mounted on the columns 48 and is movable to and from an elevated or raised position as shown in solid lines in FIGURE 2, to a lowered position as shown in phantom. The elevator chassis 52, as exemplarily shown in FIGURE 2, may be of a truss-type structure and extends substantially coextensively with the circuitous path of travel of the work racks around the treating stations. Movement of the elevator chassis 52 between the raised and lowered position can be achieved by any one of a variety of well-known power means, such as a double-acting fluid actuated cylinder 53, as diagrammatically illustrated in FIGURE 7 subsequently to be described.

Work carriers, indicated at 54 in FIGURE 2, are movably mounted on the supporting rail, including movable supporting rail sections 56 which are mounted on the underside of the elevator chassis by means of outriggers 58, as well as fixed rail sections 60 which are supported on the ends of a cross beam 62, and are disposed in a fixed lowered position extending along portions of the treating stations. The movable rail sections 56 and fixed rail sections 60 combine to form the continuous circuitous supporting rail 20 when disposed in end-to-end aligned position.

As will be noted in FIGURE 2, work racks 64 are adapted to be suspended from the work carriers 54, and are conveyed thereby through successive work stations. The work racks 64 suspended from the movable rail sections 56 are raised by the elevator chassis to a point where the lower ends thereof are in clearance relationship relative to the partitions separating adjoining treating tanks.

Intermittent advancement of the work carriers along the fixed, as well as movable, rail sections, with the exception of the rail sections adjacent to treating tanks 32, 34 and 36 (FIGURE 1), is achieved by a reciprocable-type principal pusher mechanism 65 comprising a pusher bar 66, as may be best seen in the upper right-hand corner of FIGURE 2 and in FIGURE 3, which is slidably supported in a guide shoe 68 affixed to the underside of a bracket 70 attached to the side portion of the elevator chassis. The pusher bar 66 is of a general T-shaped cross-section having its upper flanged end slidably supported in guide shoes 68 disposed at spaced intervals along the elevator chassis. A plurality of pivotally mounted pushers 72 are pivotally connected to the depending web of the pusher bar 66 at spaced intervals therealong, and are adapted to engage the upper portions of the work carriers 54 during the advancing movement of the pusher mechanism. The pushers 72 are constructed so as to engage the depending web of the pusher bar during the advancing movement thereof, which prevents pivoting of the pusher from the operative position. During the retracting movement of the pusher mechanism, the pushers 72 are adapted to pivot in response to contact with a work carrier, enabling retraction thereof behind the next adjacent work carrier preparatory to the next advancing movement.

Reciprocation of the transfer mechanism to and from a retracted position, and a projected or advanced position, is achieved by a double-acting fluid actuated transfer cylinder 74, for example, which is adapted to have its rod end attached by means of a bracket 76, as shown in FIGURES 2 and 3, to the side surface of the depending web of the pusher bar 66. Accordingly, movement of the piston rod of the double-acting transfer cylinder 74 effects a corresponding reciprocation of the pusher bar and a corresponding intermittent advancement of the work carriers along the several supporting rail sections. Reference is made to the aforementioned United States patents for alternative details of satisfactory reciprocable transfer mechanisms of the general types applicable to the conveying machine comprising the present invention.

It will be apparent that in accordance with the foregoing arrangement of the movable and fixed rail sections and the principal reciprocable transfer mechanism, the work carriers and the work racks supported therefrom are intermittently advanced along the several rail sections in accordance with the exemplary sequence described in connection with the tank layout illustrated in FIGURE 1. The principal transfer mechanism, in accordance with its arrangement as illustrated in FIGURES 2 and 3, is operative each time it is actuated to advance work carriers along the movable rail sections 56 which are carried by the chassis and along the fixed rail sections 60 only when the elevator chassis is in its lowered position. Conventionally, the principal transfer mechanism, including the pusher bar 66, is actuated each time the elevator chassis attains its raised position, effecting thereby an advancement or transfer of the work carriers and work racks thereon above the partitions separating adjoining tanks. During the descending movement of the elevator chassis, the pusher bar is normally retracted, and upon a completion of a preselected down dwell period, is again actuated in the lowered position to effect a one-station transfer of the work racks on the movable rail sections 56, as well as on the fixed rail sections 60. At those single-station tanks, such as tanks 26, 28, 30, 38, 40 and 42, illustrated in FIGURE 1, means such as a cam bar are provided for pivoting the pivotally mounted pushers 72 to an inoperative position, preventing engagement of the work carriers disposed at those single-station tanks during the down transfer movement of the principal pusher mechanism.

The principal transfer mechanism is again retracted during the ascending movement of the elevator chassis preparatory to its next operation when the elevator chassis attains the raised position. The foregoing relationship, which is not essential to a complete understanding of the present invention, is described in greater detail in the aforementioned United States patents.

As a typical example of the machine cycle hereinabove described, a total cycle time of 36 seconds will be selected, which is subdivided into the following steps: lowering of the elevator chassis, 8 seconds; down dwell period, 4 seconds; down transfer period, 8 seconds; lifting movement of the elevator chassis, 8 seconds; and up transfer period, 8 seconds. It will be apparent that the maximum down dwell period of workpieces in a single-station tank, in accordance with the foregoing cycle, will be 12 seconds, comprising the sum of the down dwell period and the down transfer period with the pusher inactivated at that station. By employing a selective delay dip mechanism at such station, the total down dwell period can be varied from zero second to 12 seconds maximum. In order to provide for an increased treating time, it heretofore was necessary to resort to a three-station receptacle in which the workpiece entered the first station, and thereafter was transferred to the second station while in the down position, and was thereafter transferred and raised from the third station. The maximum down dwell period, when employing a three-station tank, accordingly, is 48 seconds under the typical cycle time described. However, complete versatility between treatment times ranging from zero to 48 seconds cannot be attained in such a three-station tank without the use of relatively elaborate separate material handling systems which are not only extremely costly and cumbersome, but also are susceptible to malfunction and are difficult to coordinate with the operating cycle of the principal conveying machine.

In accordance with the practice of the present invention, increased versatility and simplicity are achieved by grouping the work carriers and selectively lowering them at a station at which variable processing is desired, thereby enabling the machine to be readily adapted to different operating cycles consistent with the different types of workpieces being processed. In accordance with the structure comprising the present invention, which is exemplarily described in connection with the treatment provided at two-station tank 34, down dwell cycle times of the workpieces can be controlled without limitation between zero second up to a maximum of 48 seconds. It will, of course, be appreciated that the maximum down dwell time permissible will vary depending on the total cycle time of the principal conveying machine, as well as the number of racks within a group which are processed at the multiple-station tank, such as tank 34 of FIGURE 1.

The mechanism for achieving a selected variation in the treatment time of workpieces at the two-station treating receptacle 34 will now be described with particular reference to FIGURES 2, 4, 5 and 6. As shown in the drawings, and particularly FIGURES 4 and 5, an independently movable rail section 78 is supported on the ends of lateral braces 80, which are affixed to and project outwardly from a rectangular frame 82. The rectangular frame 82 is guidably mounted for up and down movement between a pair of opposed channel guide members 84, which are fixed at their lower ends to the base platform 46, and are secured at their upper ends by means of L-shaped braces 86 to the longitudinally extending beam 50. To the upper and lower end portions of the sides of the rectangular frame 82, a flanged roller 88 is rotatably mounted and is disposed, as best seen in FIGURE 6, with its periphery in rolling bearing contact against the inner edge surfaces of the channel guide members 84. Accordingly, the rectangular frame, and the independently movable rail section 78, supported thereby, is movably and guidably restrained by the guide members 84 while in all moved positions thereof.

Movement of the rectangular frame and the independently movable rail section is achieved, such as, for example, by a double-acting fluid actuated lift cylinder 90, as best shown in FIGURE 4, having its blank end affixed to a cross brace 92, and its rod end secured by means of a clevis fitting 94, to a cross member 96, which extends between and is rigidly affixed to the upright side portions of the rectangular frame 82. The up and down movement and the actuation of the lift cylinder 90 is signaled to the central control circuit of the machine in accordance with the diagram shown in FIGURE 7, by means of an actuator 98 projecting upwardly from the lateral brace 80, as best seen in FIGURES 4 and 5, which is adapted to trip up-position limit switch LS3 when the fully raised position of the independently movable rail section 78 is attained. Similarly, an actuator 100 depends from the lateral brace 80, and is adapted to trip down-position limit switch LS4 when the fully lowered position of the independently movable rail section 78 is attained. The coordinated operation of the independently movable rail section with the other operating components of the principal conveying machine will subsequently be described in connection with the diagram comprising FIGURE 7 of the drawings.

The independently movable rail section 78 is adapted to extend above the treating tank 34 of FIGURE 1, and is effective to support two work carriers at the treating stations 22 thereof. When the rail section 78 is in the fully raised position, the end portions thereof are adapted to be disposed in end-to-end alignment with movable rail sections 56 adjacent thereto for receiving work racks from the upstream rail section, as well as for transferring work racks to the downstream rail section when the elevator chassis is in a raised position. The disposition of the vertically movable rail section 56, adjacent to the treating tank 34, is best illustrated in the upper left-hand portion of FIGURE 2. Disposed above, and in alignment with, the movable rail section 56 are two pusher mechanisms of a type similar to that previously described, and as illustrated in the upper right-hand portion of FIGURE 2. The two pusher mechanisms, as best seen in FIGURE 2, are mounted in a vertically fixed position on the underside of a C-shaped bracket 102 having its inner end affixed to the longitudinal beam 50. The single-station transfer mechanism indicated at 104 comprises a pusher bar 106 which is guidably supported in a guide shoe 108 affixed to the underside of the C-shaped bracket 102. A reciprocable transfer cylinder 110 is affixed to the depending web of the pusher bar 106, and is operative to effect a reciprocation thereof in coordination with the operation of the principal transfer mechanism in a manner subsequently to be described in connection with FIGURE 7. A plurality of pushers 112 are pivotally connected to the depending web portion of the pusher bar 106, and operate in a manner similar to that of the pusher 72 of the principal pusher mechanism.

A double transfer mechanism, indicated at 114, is mounted adjacent to the single-station transfer mechanism 104, and comprises a pusher bar 116 which also is slidably mounted and guidably supported in guide shoe 108. Reciprocation of the pusher bar 116, and the pushers 118 pivotally connected to the depending web thereof, is achieved by means of a double-station transfer cylinder 120 having its rod end connected to the pusher bar. As will be noted in the upper left-hand corner of FIGURE 2, the pushers 112 and the pushers 114 are disposed in side-by-side relationship such that the depending end portions thereof are adapted to engage a work carrier movably mounted on the movable rail section, as well as the independently movable rail section, when in the raised positions.

The operation of the several transfer cylinders of the pusher mechanisms, and of the lift cylinders for the elevator chassis and independently movable rail section, are coordinated in accordance with the schematic hydraulic and control system illustrated in FIGURE 7. The position of the various operating components are signaled by suitable sensing devices, such as the limit switches, to a central control circuit or panel indicated at 122. Actuation of the individual components in the exemplary embodiment illustrated is achieved hydraulically by a system including a reservoir tank 124 connected to the inlet side of a pump 126, which in turn is drivingly coupled to a drive motor 128. The discharge or pressure side of the pump 126 is connected to a supply conduit 130, which, through a series of branch conduits connected thereto, is operative to supply pressurized fluid to the hydraulically-actuated power means. Hydraulic or other actuating fluid is returned from the operating components through a return conduit 132 which discharges into the reservoir tank 124.

As shown in FIGURE 7, the principal transfer mechanism 65, including the pusher bar 66, is reciprocated to and from a projected position and a retracted position by the transfer cylinder 76, and the attainment of the projected position and the retracted position is signaled, respectively, by forward limit switch LS10 and rearward limit switch LS9 in response to a tripping thereof by the actuator 134. Similarly, the single-station transfer mechanism 104 is reciprocated in coordination with the principal transfer mechanism 65 by the double-acting transfer cylinder 110, and the attainment of the projected position and the retracted position of the pusher bar 106 thereof is signaled, respectively, by the tripping of forward limit switch LS6 and retract limit switch LS5 by the actuator 136.

The two-station, or double-station, transfer mechanism 114 is exemplarily shown in FIGURE 7 as a continuous belt or flexible element 138 trained about two pulleys 140, one of which is drivingly coupled to a reversible fluid-actuated motor 142. The pushers 118 are pivotally mounted at spaced intervals on the underside of the flexible element 138. A valve, indicated at 144, is controlled by the central control circuit for initiating operation of the hydraulic motor 142 at the appropriate time and in the appropriate direction to effect intermittent reciprocatory movement of the flexible element 138 and the pushers 118 thereon. The position of the pushers 118 is signaled to the central control circuit by forward limit switch LS7 and retracted limit switch LS8 in response to a tripping thereof by actuator 146. The use of a continuous reciprocable belt transfer mechanism is merely illustrative of alternate satisfactory transfer mechanism which can be satisfactorily employed in accordance with the present invention.

In addition to the foregoing, the elevator chassis 52, which is moved to and from a raised position and a lowered position by the lift cylinder 53, communicates its position to the central control circuit by means of up-position limit switch LS1 and down-position limit switch LS2, which are adapted to be tripped by a suitable actuator or component of the chassis. The movable rail sections 56 undergo a corresponding ascending and descending movement with the elevator chassis. Similarly, the position of the independently movable rail section 78, which is movable by the lift cylinder 90, is communicated to the central control circuit by means of up-position limit switch LS3 and down-position limit switch LS4. It will be noted that the inlet valves to the lift cylinder 90 are electrically coupled to a timer 148 of the types well known in the art, which can be preset so as to lower the independently movable rail section 78 any preselected interval after the elevator chassis has been lowered or, alternatively, to maintain the independently movable rail section 78 in a continuous raised position, providing therewith a skip operation. The remaining valves disposed at the inlet and outlet points of the several hydraulic cylinders may suitably be solenoid control valves which are coupled to the central control circuit that effects actuation thereof, and controls the passage of the pressurized fluid and release of the return fluid in an automatic preselected sequence.

The particular coordinated operating sequence, as provided by the system as described in FIGURE 7, will now be described in connection with the sequence diagrams as illustrated in FIGURES 8 to 15, inclusive. In the arrangement as schematically illustrated, stations A and B correspond, respectively, to treating tanks 28 and 30 in the arrangement as previously described in FIGURE 1. Tank 32 corresponds to treating station C1 and C2, while treating stations D1 and D2 correspond to the two-station tank 34 at which a selected variation in the treating dwell of certain of the workpieces is to be accomplished. Station E1 and E2 similarly correspond to tank 36, while stations F and G are equivalent to tanks 38 and 40, respectively, of the tank layout shown in FIGURE 1. Extending above stations A, B, C1 and C2 is a first movable rail section 56, while a second movable rail section 56 extends above stations E1, E2, F and G. The independently movable rail section 78 extends above stations D1 and D2, and is disposed with its ends in aligned relationship with the adjacent movable rail sections when all of the several rail sections are in the raised position, as shown in FIGURE 8. The single-station pusher mechanism 104, including the pushers 112 thereon, are adapted to engage the work carriers on the two movable rail sections and to advance the work carriers one station when the movable rail sections and the independently movable rail section are in the raised position. The double-station transfer mechanism 114 incorporates four pushers 118 thereon, and is adapted to transfer four work carriers simultaneously through a two-station increment on and off the independently movable rail section 78.

In operation, the work racks are sequentially conveyed, commencing with the positions as shown in FIGURE 8, wherein the independently movable rail section 78, and the movable rail sections 56, are in the fully raised position, and the single-station and double-station transfer mechanisms are in the retracted position. In that position, the pushers 118 of the double-station transfer mechanism are disposed behind work racks 3, 4, 5 and 6 disposed above stations D2, D1, C2 and C1, respectively, while the pushers 112 of the single-station transfer mechanism 104 are disposed behind the remaining work carriers. In that position and in response to the tripping of up-position limit switches LS3 and LS1 (FIGURE 7) signalling the central control circuit that the elevator chassis and the independently movable rail section have attained the fully raised position, the transfer mechanisms are actuated, effecting an advancement of the work carriers toward the right, as viewed in FIGURE 8, from the positions as shown in FIGURE 8, to the positions as shown in FIGURE 9. As will be noted in FIGURE 9, the work carriers 3 and 4 are advanced through a two-station increment, as are work carriers 5 and 6, which are now disposed on the independently movable rail section 78 above stations D2 and D1, respectively. The remaining work racks are transferred through a one-station increment by the single-station transfer mechanism, and wherein a position on the first movable rail section above station C2 has been vacated.

At the completion of the advancing movement of the transfer mechanisms, as signaled by forward position limit switches LS7 and LS6 (FIGURE 7), the lift cylinder of the elevator chassis is actuated, wherein the movable rail sections are moved to the lowered position, while the independently movable rail section is retained in the raised position, in accordance with the setting of the timer 148 (FIGURE 7), to provide a preselected down dwell period. Accordingly, the movable rail sections move from the position as shown in FIGURE 9 to the position as shown in FIGURE 10, with the racks 5 and 6 retained above the stations D2 and D1, respectively.

At the completion of a preselected timing period, as controlled by the timer 148 (FIGURE 7), the independently movable rail section is lowered from the position as shown in FIGURE 10 to the position as shown in FIGURE 11, wherein the racks 5 and 6 are subjected to the treatment of stations D2 and D1, respectively. During the same time interval as established by a suitable down dwell timer incorporated in the central control circuit, the lift cylinder of the elevator chassis is again actuated, effecting a raising of the elevator chassis and the movable rail sections from the position as shown in FIGURE 10 to the position as shown in FIGURE 11. At the completion of the ascending movement of the elevator chassis, the single transfer mechanism 104 is again actuated, effecting a single-station advancement of work racks 1–4 and 7–9 from the positions as shown in FIGURE 11 to the positions as shown in FIGURE 12. During this time interval, the independently movable rail section remains in the lowered position and the double-station transfer mechanism is not actuated.

At the completion of the advancing movement of the single-station transfer mechanism, the lift cylinder 53 of the elevator chassis (FIGURE 7) is again actuated, effecting a lowering of the movable rail sections from the position as shown in FIGURE 12 to the position as shown in FIGURE 13, wherein all of the work racks are now immersed in the respective treating stations. It will be noted in the sequence, as illustrated in FIGURES 11–13, that the vacancy on the movable rail section above station C2 has now been filled with work rack 7, while a vacancy has been created on the input end of the movable rail section above station E1 by the transfer of work rack 4 to station E2.

At the completion of an appropriate down dwell period, as determined by the master down dwell cycle timer incorporated in the central control circuit, the lift cylinders 53 and 90 (FIGURE 7) of the elevator chassis and independently movable rail section, respectively, are actuated effecting a simultaneous upward movement of the several rail sections from the position as shown in FIGURE 13 to the position as shown in FIGURE 14. The position of the work carriers in FIGURE 14, corresponds essentially to the disposition originally illustrated in FIGURE 8, but wherein each of the work carriers has been advanced through a two-station increment. When the up-position limit switches LS1 and LS3 (FIGURE 7) are tripped, signalling that the elevator chassis and independently movable rail sections have attained the fully raised position, both the double-station transfer mechanism 114 and the single-station transfer mechanism 104 are actuated, effecting a single-station advancement of work racks 2–4 and 9–11, and a double-station transfer of work racks 5–8. The position of the racks in FIGURE 15 corresponds generally to that previously described in connection with FIGURE 9 where the work racks advance two stations from that previously disclosed. From the position as shown in FIGURE 15, the work racks are again passed through an operating cycle corresponding to that previously described in connection with FIGURES 10–14.

It will be apparent from the foregoing that the coordinated operation of the elevator chassis, independently movable rail section, and the single-station and double-station transfer mechanism is effective to achieve a grouping of the work racks in pairs above stations C1 and C2, and to advance them in pairs for individual treatment above stations D1 and D2, and thereafter transfer them in pairs to positions above stations E1 and E2. When the work racks arrive at stations E1 and E2, they are ungrouped by the single-station transfer mechanism, and thereafter advance individually through one station increments for the remainder of the operating cycle. It will be further noticed that the operation of the double-station transfer mechanism occurs only once for each two operations of the single-station transfer mechanism. It will, of course, be appreciated that the machine, as herein described, may incorporate two or more independently movable rail sections at selected stations therealong, at which the work carriers are grouped and treated as a group on the independently movable rail section after which they are again ungrouped and are transferred separately thereafter.

It will be further appreciated that while the sequence as described in connection with FIGURES 8–15 is directed to a grouping consisting of two work racks, the invention is equally applicable to a grouping of three or more work racks which are handled as a group, in which event the multiple-station transfer mechanism is operative once for each plurality of operations of the single-station transfer mechanism corresponding to the number of work racks in the group processed.

In accordance with this arrangement, work racks being transferred individually are formed into groups at a multiple-station tank disposed adjacent to the independently movable rail section, and subsequently are ungrouped at a multiple-station tank following the independently movable rail section. It will also be apparent that when the groups contain three or more work carriers each, the total duration of processing time can be substantially increased over that which is achieved when using groups comprising only two workpieces. It will be further noted that stations C1 and C2 and stations E1 and E2, corresponding to multiple-station tanks 32 and 36, respectively, of FIGURE 1, generally provide a treatment which is not critical from the standpoint of duration, such as, for example, a rinse and spray operation, such that variations in the duration of the treatment of the work racks in the input and output multiple-station tanks does not appreciably affect the end result or quality of surface finish of the workpieces processed.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a conveying machine, the combination including a first, second and third group, each comprising a plurality of work stations; first, second and third rail means extending along said first, second and third group of work stations, respectively, for movably supporting workpieces disposed at spaced intervals therealong; means for moving said first and said third rail means up and down above the work stations, means for selectively moving said second rail means up and down above the work stations independently of said first and said third rail means, the several said rail means when in a raised position disposed with said second rail means in position to receive workpieces from said first rail means and with said third rail means in position to receive workpieces from said second rail means, first transfer means for transferring workpieces in one station increments along said first and said third rail means, second transfer means for simultaneously transferring a first plurality of workpieces through a multiple-station increment from said first rail means to said second rail means and for simultaneously transferring a second plurality of workpieces through the same multiple-station increment from said second rail means to said third rail means when said several rail means are in said raised position, said second transfer means operable at an interval of once for each plurality of operations of said first transfer means equivalent to the number of workpieces in said first plurality.

2. The machine as defined in claim 1 wherein said second transfer means is operated in synchronization with one of the operations of said first transfer means.

3. The machine as defined in claim 1 wherein said first, second and third group each comprise two work stations.

4. The machine as defined in claim 1 wherein said first, second and third group each comprise three work stations.

5. The machine as defined in claim 1 wherein said first and said third rail means are lowered and thereafter raised after each operation of said first transfer means.

6. The machine as defined in claim 1 wherein at least some of said work stations include solutions in which the workpieces are immersed when the rail means on which said workpieces are supported is in the lowered position.

7. The machine as defined in claim 1 wherein control means are provided for lowering said second rail means a preselected time interval after the completion of the operation of said second transfer means and for raising said second rail means prior to the next operation of said second transfer means.

8. The machine as defined in claim 1 including control means incorporating sensing means for coordinating the operating sequence of said machine.

References Cited

UNITED STATES PATENTS

| 2,591,681 | 4/1952 | Davis | 134—77 |
| 2,650,600 | 9/1953 | Davis | 134—77 |
| 2,997,191 | 8/1961 | Finston | 134—83 XR |
| 3,013,678 | 12/1961 | Clark | 134—77 XR |
| 3,278,409 | 10/1966 | Barringer et al. | 204—198 |

CHARLES A. WILLMUTH, *Primary Examiner.*

ROBERT L. BLEUTGE, *Examiner.*